SCREEN PRINTING APPARATUS

Filed March 14, 1961 2 Sheets-Sheet 1

INVENTOR.
Anson G. Sherman
BY Webb, Mackey & Burden
HIS ATTORNEYS

INVENTOR.
Anson G. Sherman
BY Webb, Mackey & Burden
HIS ATTORNEYS

United States Patent Office 3,071,069

Patented Jan. 1, 1963

3,071,069

SCREEN PRINTING APPARATUS

Anson G. Sherman, Fort Lauderdale, Fla., assignor to Dry Screen Process, Inc., Pittsburgh, Pa., a corporation of Pennsylvania Filed Mar. 14, 1961, Ser. No. 95,545
2 Claims. (Cl. 101—123)

This invention relates to screen printing apparatus, and particularly to apparatus for printing thermoplastic printing compositions or resist materials onto stock supported by a flat or curved bed.

The present invention is an improvement on the screen printing apparatus disclosed in U.S. patent application Serial No. 781,659 filed December 19, 1958, now abandoned. This prior application discloses a screen printing apparatus including a squeegee supported by a carrier which travels back and forth over a screen mounted on a stand. The squeegee moves across the screen which is a stencil comprising a design, printed matter, printed circuits, solder markings, or the like. The stock to be printed is placed beneath the screen and as the squeegee moves across the screen, the printing composition is forced through the screen by the squeegee and into contact with the stock.

Specifically, the present invention is an improvement on the squeegee and apparatus for supplying the printing composition to the screen. Only my improvement is described in the present application and U.S. patent application Serial No. 781,659 is incorporated herein by reference.

I have found that in printing long pieces of stock, it is imperative to supply an even, continuous flow of printing composition or resist materials on the screen in front of the squeegee to produce commercially acceptable products. I have also found that it is desirable to supply only enough printing composition or resist material to the screen to achieve the desired printing on the stock, thereby avoiding the usual clean-up of excess material required at the end of the squeegee movement.

I have also found that a forced feed of the printing composition onto the screen is desirable when using some printing compositions even though the compositions are heated to a liquid state in the reservoir. The forced feed achieves a more even distribution of the printing composition on the screen and a more rapid and efficient utilization of the screen printing apparatus.

The present invention is particularly adapted for use on machines wherein the squeegee is moved across the screen by automatically operated mechanical means to provide an even, consistent movement of the squeegee. These mechanical means, such as motors and chain drives, are well-known. I have found that when the squeegee and its associated reservoir are moved by mechanical means across the screen, rather than manually as disclosed in the above application, it is necessary to provide a continuous, even flow of the printing composition onto the screen to insure consistent results on the printed stock.

In the accompanying drawings, I have shown a preferred embodiment of my invention in which:

FIGURE 5 is an enlarged cross section of a portion of FIGURE 4;

Briefly, the present invention includes a reservoir containing a printing composition or resist material and a gear pump located at the bottom of the reservoir to supply the composition or material to and through a channel at the bottom of the reservoir immediately adjacent the squeegee. The squeegee is flexible and functions as a valve in opening and closing the channel.

The reservoir, squeegee and associated apparatus of the present invention are mounted on a carriage in the manner shown in U.S. patent application Serial No. 781,659. The carriage moves back and forth over a screen mounted above a bed supporting the stock to be printed. The above-mentioned application discloses a manually movable carriage and squeegee; however, the present invention is preferably used with a well-known mechanically movable carriage supporting the squeegee and reservoir.

The reservoir includes a front wall 10, a rear wall 11, and two vertical triangular-shaped end walls 12 and 13. The front and rear walls are bolted to the end walls. The end walls completely close the ends of the reservoir and extend to the lowermost edges of the side walls. The reservoir has an inverted triangular cross section with an open top to permit introduction of the printing composition or resist into the reservoir. Conventional heaters 14 and 15 are affixed to the front and rear walls in the manner shown in FIGURE 4 and suitable electrical connections are provided to activate the heaters. The heaters transmit heat to the reservoir and maintain the printing composition in a flowable condition.

Figure 1:
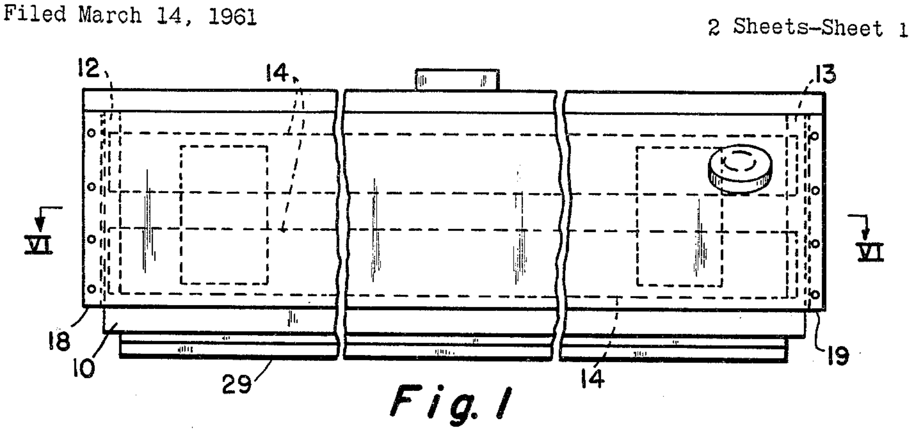
FIGURE 1 is a front elevation view of the squeegee and reservoir of my invention.
Figures 2, 3, 4:
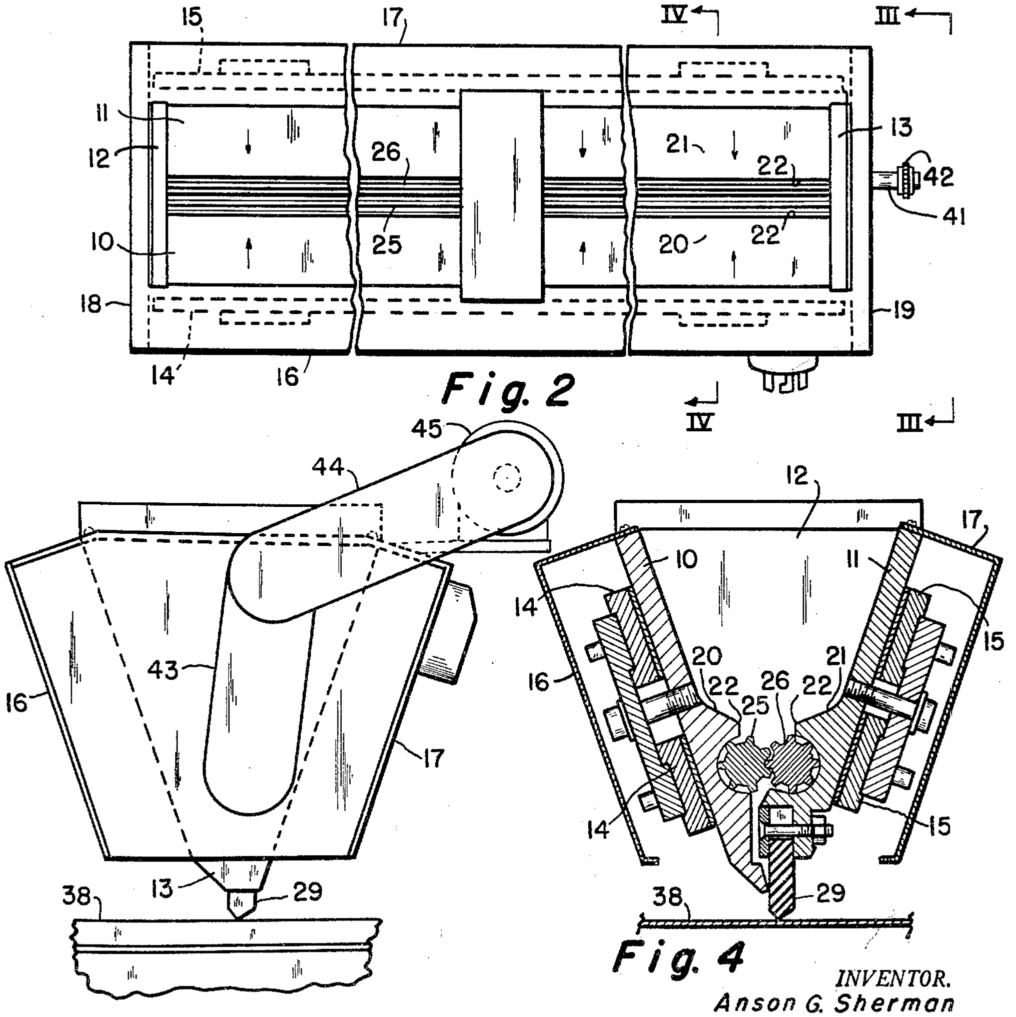
FIGURE 2 is a plan view of the squeegee and reservoir of my invention.
FIGURE 3 is a side elevation view of the squeegee and reservoir of my invention, taken on line III—III of FIGURE 2.
FIGURE 4 is a cross section taken on line IV—IV of FIGURE 2.

The entire reservoir is encased in an insulating enclosure which includes a front insulating plate 16, a rear insulating plate 17, and end insulating plates 18 and 19. These plates are bolted together to form the insulating enclosure which is affixed to the top of the reservoir by bolts or the like as shown in FIGURE 4.

The inside faces of the front and rear walls 10 and 11 of the reservoir slope downwardly and curve inwardly toward each other at about the two-thirds point of the height of each wall. The inwardly curved portions 20 and 21 of the walls end abruptly at edges 22. The inside faces extend downwardly from edges 22 to cut-out portions 23 and 24 which provide housings for the gears 25 and 26 of the gear pump. An opening 27 is located below the gear pump and between the two walls. Opening 27 extends into a channel 28 which ends at a squeegee 29. The front wall 10 has an inwardly directed ledge 30 providing one surface of a projecting nose 31 which extends below the lower end of the rear wall 11. This nose has a smooth inner surface 32 which slopes toward the squeegee and terminates as a pointed edge at its lower end. The pointed edge contacts the squeegee, as shown in FIGURE 5, when the squeegee is in a straight downwardly directed position.

Figure 7:
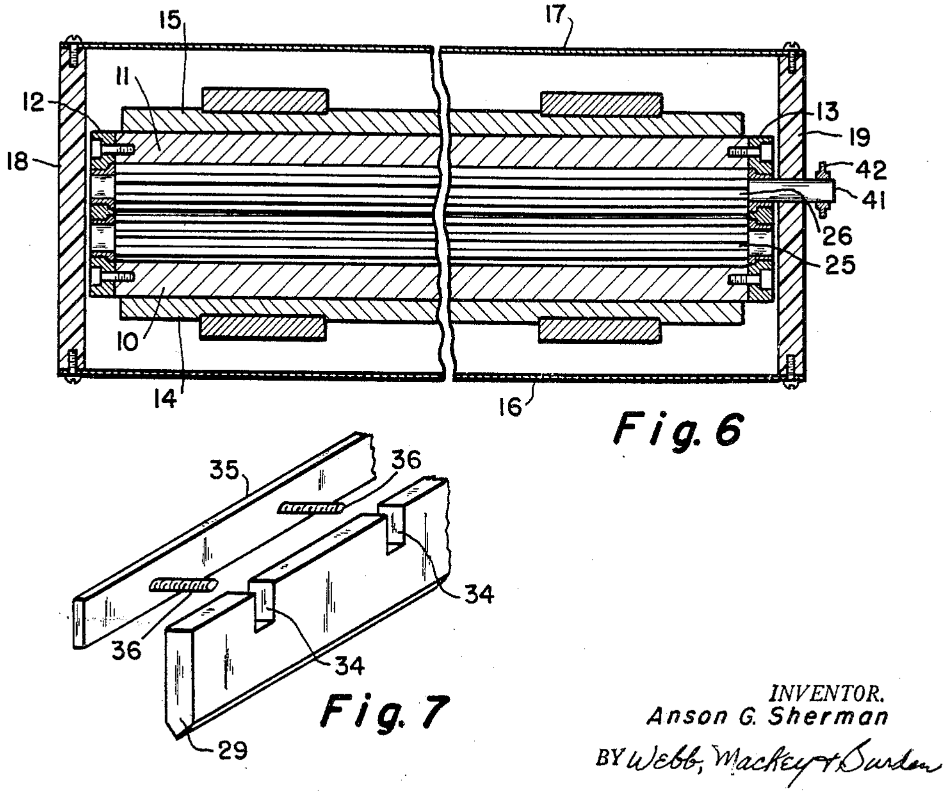
FIGURE 7 is an isometric of a squeegee and a squeegee mounting bar according to my invention.

The rear wall 11 has a plurality of spaced circular openings 33 along its entire lower edge. The squeegee 29 is of known construction and material as described in the above application and has cut-out portions 34 along its upper edge as shown in FIGURE 7. A mounting plate 35 has integral bolts 36 which extend through the portions 34 in the squeegee and into the openings 33 in the rear wall 11. Nuts 37 are tightly threaded on the bolts 36, thereby rigidly clamping the squeegee to the rear wall, as shown in FIGURE 5. The end walls 12 and 13 completely enclose the ends of the squeegee and nose 31 to prevent bypass of the printing composition past the ends of the squeegee. The squeegee is flexible and moves from its normal position, shown in solid lines in FIGURE 5, to the position shown in chain lines in FIGURE 5 during its printing movement along the screen 38 in the direction of the arrow 39 of FIGURE 5. When the carriage is retracted in a direction opposite to the arrow 39, the squeegee returns to the solid line position shown in FIGURE 5. Thus, the squeegee functions as a valve against the pointed edge of surface 32 of the front wall 10 and permits the printing composition 40 to be deposited immediately forward of the squeegee during the printing movement of the squeegee along the screen.

Figure 6:
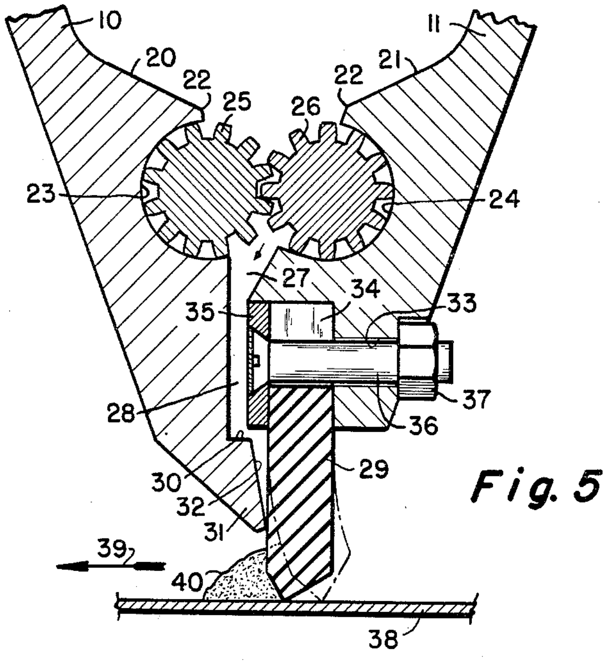
FIGURE 6 is a cross section taken on line VI—VI of FIGURE 1.

The gear pump includes two axially elongated gears 25 and 26 which mesh with each other and rotate downwardly toward each other as viewed in FIGURE 5. The gears are rotatably mounted in bearings in the end walls 12 and 13 of the reservoir as shown in FIGURE 6. One of the gears has an integral shaft 41 which extends through beyond the end wall 13 and insulating wall 19 and has an integral driving sheave or gear 42 of for a chain drive. FIGURE 3 shows drive covers 43 and 44 positioned over well-known driving means such as chains or belts which transmit rotary power motion from a drive motor 45 (mounted on the reservoir) to the shaft 41 to drive the gears 25 and 26. Suitable electrical and/or mechanical mechanisms are provided to manually or automatically stop the motor 45 when sufficient printing composition has been fed from the reservoir to the screen.

In operation, the printing composition or resist material is placed inside the reservoir, maintained in flowable condition by heaters 14 and 15, and pumped by gears 25 and 26 through channel 28 to a position immediately ahead of the squeegee 29. Preferably, the composition is pumped continuously and evenly while the squeegee is moving over the screen. My invention is simple in construction, easy to maintain, and the squeegee may be readily replaced by loosening nuts 37 and pulling the squeegee downward. The gear pump extends across the entire reservoir and provides an even, continuous flow of material to the screen.

Throughout the following claims, the term "printing composition" means any useful material for screen printing, including resist materials.

While I have described a present preferred embodiment of my invention, it may be otherwise embodied within the scope of the following claims.

I claim:

1. A screen printing apparatus having a bed to support stock to be printed, a screen overlying said bed and stock, a printing composition reservoir movable over said screen, a squeegee affixed to said reservoir and adapted to wipe the printing composition over said screen; said reservoir being a hollow container having front, rear and end walls, said front and rear walls sloping downwardly toward each other to form a V-shaped trough with the apex pointed downward, the front and rear walls sloping inward toward each other near the bottom of the trough and then substantially vertical to provide a slot opening along the entire apex; opposed portions of each of said vertical sections of the front and rear walls being removed to provide housings; a shaft positioned in each of said housing and rotatably mounted about its longitudinal axis in said end walls, each of said shafts having gear teeth extending longitudinally along its entire length, the gear of the shafts meshing in a vertical plane passing along said slot opening; the shafts being rotatable toward each other and said apex; a flexible squeegee affixed within said slot opening; the squeegee being movable from a first position completely closing said slot opening to a second position wherein said slot opening is open to permit movement of printing composition from the trough to the screen.

2. In a screen printing apparatus having a screen overlying stock to be printed, a reservoir movable along and over said screen and having side walls inclined downwardly toward each other, an opening in the top of the reservoir to introduce a printing composition into the reservoir; the bottom edges of said side walls being slightly spaced from each other to provide an opening in the bottom of the reservoir; a flexible squeegee extending downwardly from the reservoir into contact with the screen; a pair of axially elongated gears, said gears being rotatably mounted in the reservoir about their longitudinal axes, the gears meshing together and extending the entire width of the reservoir immediately above the opening in the bottom of the reservoir; housings in said side walls enclosing a substantial portion of the periphery of each gear; the printing composition moving from the upper part of the reservoir through the gears and opening to the screen.

References Cited in the file of this patent

UNITED STATES PATENTS

| | | |
|---|---|---|
| 1,413,995 | Salerno | Apr. 25, 1922 |
| 1,776,459 | Tull et al. | Sept. 23, 1930 |
| 2,027,102 | Hommel et al. | Jan. 7, 1936 |
| 2,081,906 | Ball | June 1, 1937 |
| 2,130,659 | Wedemeyer | Sept. 20, 1938 |
| 2,887,044 | Smejda | May 19, 1959 |
| 2,918,866 | Reed | Dec. 29, 1959 |
| 2,956,499 | Nowak | Oct. 18, 1960 |